(12) United States Patent
Szczepanowski et al.

(10) Patent No.: US 11,143,110 B2
(45) Date of Patent: Oct. 12, 2021

(54) AERODERIVATIVE JET ENGINE ACCESSORY STARTER RELOCATION TO MAIN SHAFT—DIRECTLY CONNECTED TO HPC SHAFT

(71) Applicant: General Electric Company, Schenectady, NY (US)

(72) Inventors: Pawel Szczepanowski, Warsaw (PL); Mateusz Goldyn, Warsaw (PL)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 77 days.

(21) Appl. No.: 16/575,888

(22) Filed: Sep. 19, 2019

(65) Prior Publication Data

US 2020/0025096 A1    Jan. 23, 2020

Related U.S. Application Data

(63) Continuation of application No. 15/286,714, filed on Oct. 6, 2016, now Pat. No. 10,458,338.

(30) Foreign Application Priority Data

Oct. 19, 2015   (PL) .......................................... 414430

(51) Int. Cl.
*F02C 7/268*    (2006.01)
*F02C 7/275*    (2006.01)
(Continued)

(52) U.S. Cl.
CPC .............. *F02C 7/275* (2013.01); *F02C 7/268* (2013.01); *F02C 3/04* (2013.01); *F02C 7/266* (2013.01);
(Continued)

(58) Field of Classification Search
CPC .... F02C 7/26; F02C 7/268; F02C 7/27; F02C 7/275; F02C 7/277
See application file for complete search history.

(56) References Cited

U.S. PATENT DOCUMENTS 2,652,865 A * 9/1953 Grenier .................... B27M 3/20
                                                144/143
2,663,994 A * 12/1953 Lombard et al. ....... F02C 7/275
                                                60/788

(Continued)

FOREIGN PATENT DOCUMENTS

EP   1939406 A2   12/2007
GB   2443194 A1    4/2008

OTHER PUBLICATIONS

European Search Report Corresponding to EP161937370 dated Mar. 1, 2017.

*Primary Examiner* — Todd E Manahan
*Assistant Examiner* — Alyson Joan Harrington
(74) *Attorney, Agent, or Firm* — Venable LLP; Michele V. Frank

(57) ABSTRACT

In one aspect, the present disclosure is directed to a gas turbine starting system that includes a shaft coupling a compressor and a turbine. An annular housing extends circumferentially around the shaft such that the annular housing defines a compartment. A flange extends radially outward from the annular housing for mounting the annular housing to a stationary wall. A starter is positioned in the compartment. A collar rotatably couples to the annular housing and selectively couples to the starter. The collar includes a radially inner surface having a plurality of splines for engaging the shaft. The starter, when activated, rotates the collar, which rotates the shaft to start the gas turbine.

16 Claims, 4 Drawing Sheets

(51) Int. Cl.
   *F02C 7/266* (2006.01)
   *F02C 7/32* (2006.01)
   *F02C 7/27* (2006.01)
   *F02C 7/277* (2006.01)
   *F02C 3/04* (2006.01)

(52) U.S. Cl.
   CPC .............. *F02C 7/27* (2013.01); *F02C 7/277* (2013.01); *F02C 7/32* (2013.01); *F05D 2220/766* (2013.01); *F05D 2260/85* (2013.01)

(56) References Cited

U.S. PATENT DOCUMENTS

| | | | |
|---|---|---|---|
| 2,696,711 A * | 12/1954 | Ivor | .............. F02C 7/275 60/788 |
| 3,873,235 A | 3/1975 | Mendelson | |
| 5,309,029 A | 5/1994 | Gregory et al. | |
| 5,349,814 A | 9/1994 | Ciokajlo et al. | |
| 5,349,818 A * | 9/1994 | McFadyen | ............. B63H 25/22 137/106 |
| 5,363,641 A | 11/1994 | Dixon et al. | |
| 6,447,248 B1 | 9/2002 | Kastl et al. | |
| 6,914,344 B2 | 7/2005 | Franchet et al. | |
| 7,251,942 B2 | 8/2007 | Dittmar et al. | |
| 7,750,521 B2 | 7/2010 | Qu et al. | |
| 7,997,085 B2 | 8/2011 | Moniz et al. | |
| 8,112,983 B2 | 2/2012 | Bradbrook et al. | |
| 8,314,505 B2 | 11/2012 | McLoughlin et al. | |
| 8,801,372 B2 | 8/2014 | Shi et al. | |
| 8,829,702 B1 | 9/2014 | Menheere et al. | |
| 9,003,638 B2 | 4/2015 | Menheere et al. | |
| 11,007,955 B2 * | 5/2021 | Klemen | ................ B64D 27/10 |
| 2004/0070211 A1 | 4/2004 | Franchet et al. | |
| 2004/0140672 A1 | 7/2004 | Gozdawa | |
| 2010/0005810 A1 | 1/2010 | Jarrell et al. | |
| 2013/0111917 A1 | 5/2013 | Ho et al. | |
| 2016/0312710 A1 * | 10/2016 | Eifert | ...................... F23R 3/286 |

* cited by examiner

AERODERIVATIVE JET ENGINE ACCESSORY STARTER RELOCATION TO MAIN SHAFT—DIRECTLY CONNECTED TO HPC SHAFT

CROSS-REFERENCE TO RELATED APPLICATIONS

This application is a continuation of and claims the benefit of priority of U.S. patent application Ser. No. 15/286,714, filed on Oct. 6, 2016, which, in turn, claims the benefit of priority to Polish Application No. P.414430, filed on Oct. 19, 2015.

FIELD OF THE INVENTION

The present subject matter relates generally to a gas turbine engine and, more particularly, to a starting system for a gas turbine engine.

BACKGROUND OF THE INVENTION

Gas turbine engines typically include a compressor section, a combustor, and a turbine section. A rotor shaft rotatably couples the compressor section and the turbine section. In this respect, the compressor compresses air entering the gas turbine engine. This compressed air mixes with fuel in the combustor to form an air and fuel mixture, which produces hot exhaust gases when ignited. These hot exhaust gases then flow through the turbine section before exiting the gas turbine engine. The turbine section extracts kinetic energy from the exhaust gases, which, in turn, rotates the rotor shaft. The rotation of the rotor shaft provides the necessary mechanical energy to the compressor section to compress the incoming air.

In order to start the gas turbine engine, it is necessary to rotate the rotor shaft to provide compressed air to the combustor. But, the turbine section is unable to rotate this shaft during starting because the combustor is not yet producing exhaust gases. In this respect, a starter (e.g., an electric motor, hydraulic motor, pneumatic motor, etc.) must rotate the rotor shaft until the combustor produces exhaust gases.

Typically, the starter indirectly couples to the rotor shaft in conventional gas turbine stating systems. More specifically, the starter rotates an axial shaft, which couples to a transfer gearbox (TGB). The TGB transfers the rotation of the axial shaft to a radial shaft. That is, the TGB converts the axial rotation into radial rotation. An inlet gearbox (IGB) or a power takeoff (PTO) transfers the rotation of the radial shaft to the rotor shaft. That is, the IGB/PTO converts the radial rotation back to axial rotation.

But, the TGB, IGB/PTO, radial shaft, and axial shaft are expensive and time consuming to manufacture and assemble. Furthermore, these components increase the overall complexity and weight of the gas turbine engine. Accordingly, a starting system for a gas turbine engine that couples the starter directly to the rotor shaft without the need for multiple gearboxes and/or additional shafts would be welcomed in the technology.

BRIEF DESCRIPTION OF THE INVENTION

Aspects and advantages of the invention will be set forth in part in the following description, or may be obvious from the description, or may be learned through practice of the invention.

The starting system for a gas turbine engine disclosed herein directly couples to a high pressure shaft in the gas turbine engine. In this respect, the TGB, IGB/PTO, radial shaft, and axial shaft are superfluous components and may be removed from the gas turbine engine. As such, starting system disclosed herein reduces the cost, complexity, and weight of the gas turbine engine over conventional starting systems. Moreover, any accessories normally coupled to the TGB, IGB/PTO, radial shaft, and axial shaft may be relocated and powered by one or more electric motors. Furthermore, the starting system disclosed herein may be installed in the field after initial manufacture of the gas turbine engine.

In one aspect, the present disclosure is directed to a gas turbine starting system that includes a shaft coupling a compressor and a turbine. An annular housing extends circumferentially around the shaft such that the annular housing defines a compartment. A flange extends radially outward from the annular housing for mounting the annular housing to a stationary wall. A starter is positioned in the compartment. A collar rotatably couples to the annular housing and selectively couples to the starter. The collar includes a radially inner surface having a plurality of splines for engaging the shaft. The starter, when activated, rotates the collar, which rotates the shaft to start the gas turbine.

In another aspect, the present disclosure is directed to a gas turbine having a compressor section, a combustor, and a turbine section. A shaft couples the compressor and the turbine. An annular housing extends circumferentially around the shaft such that the annular housing defines a compartment. A flange extends radially outward from the annular housing for mounting the annular housing to a stationary wall. A starter is positioned in the compartment. A collar rotatably couples to the annular housing and selectively couples to the starter. The collar includes a radially inner surface having a plurality of splines for engaging the shaft. The starter, when activated, rotates the collar, which rotates the shaft to start the gas turbine.

These and other features, aspects and advantages of the present invention will be better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
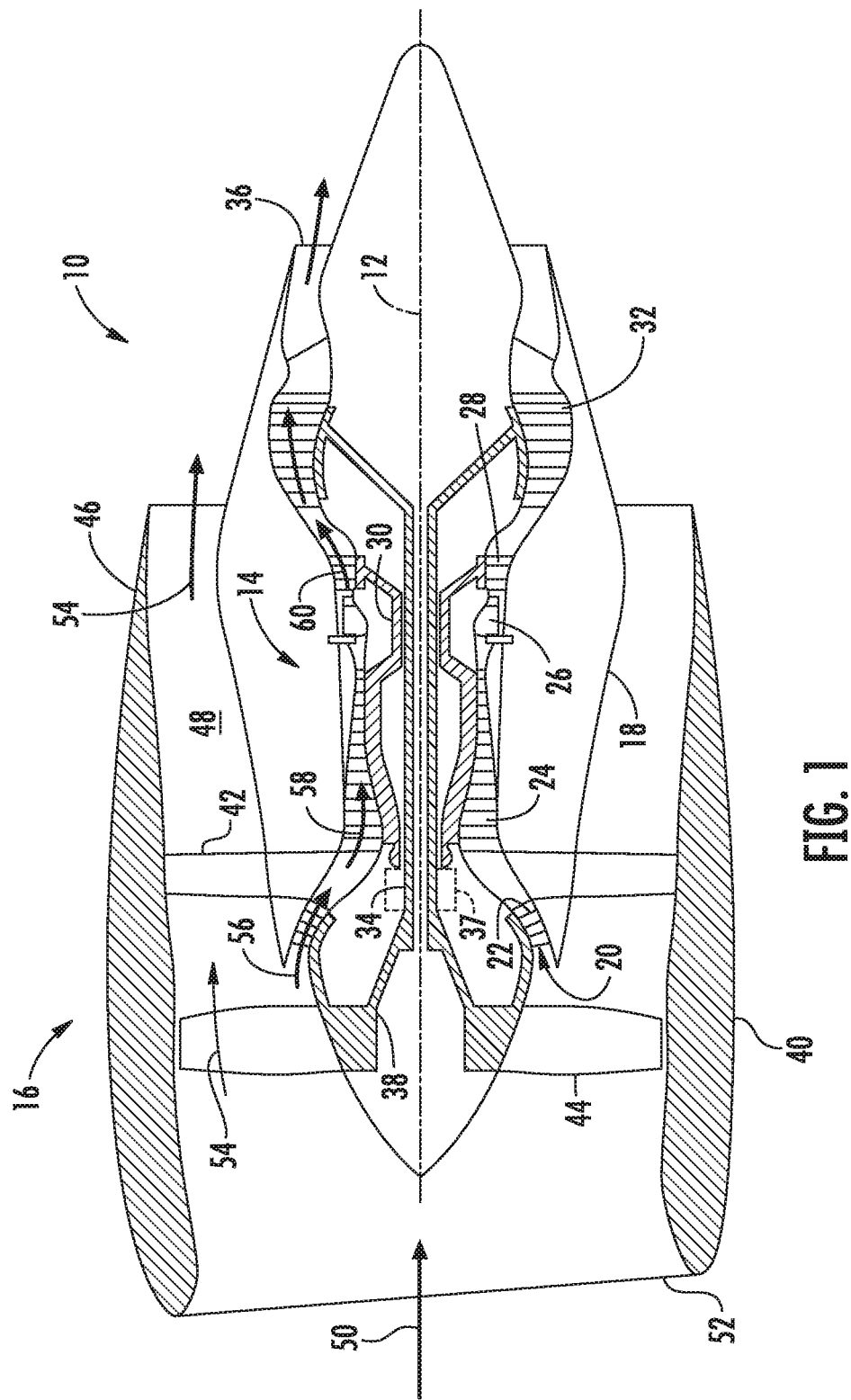
FIG. 1 is a cross-sectional view of one embodiment of a gas turbine engine that may be utilized within an aircraft in accordance with aspects of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to the drawings, FIG. 1 illustrates a cross-sectional view of one embodiment of a turbofan gas turbine engine 10 ("turbofan 10") that may be utilized within an aircraft in accordance with aspects of the present subject matter, with the turbofan 10 being shown having a longitudinal or axial centerline axis 12 extending therethrough for reference purposes. In general, the turbofan 10 may include a core gas turbine engine (indicated generally by reference character 14) and a fan section 16 positioned upstream thereof. The core engine 14 may generally include a substantially tubular outer casing 18 that defines an annular inlet 20. In addition, the outer casing 18 may further enclose and support a low pressure compressor section 22 for increasing the pressure of the air that enters the core engine 14 to a first pressure level. A high pressure, multi-stage, axial-flow compressor section 24 may then receive the pressurized air from the low pressure compressor section 22 and further increase the pressure of such air. The pressurized air exiting the high-pressure compressor section 24 may then flow to a combustor 26 within which fuel is injected into the flow of pressurized air, with the resulting mixture being combusted within the combustor 26. The high energy combustion products are directed from the combustor 26 along the hot gas path of the turbofan 10 to a high pressure turbine section 28 for driving the high pressure compressor section 24 via a high pressure shaft 30, and then to a low pressure turbine section 32 for driving the low pressure compressor section 22 and fan section 16 via a low pressure shaft 34 generally coaxial with high pressure shaft 30. After driving each of turbine sections 28 and 32, the combustion products may be expelled from the core engine 14 via an exhaust nozzle 36 to provide propulsive jet thrust.

Additionally, as shown in FIG. 1, the fan section 16 of the turbofan 10 may generally include a rotatable, axial-flow fan rotor assembly 38 surrounded by an annular fan casing 40. It should be appreciated by those of ordinary skill in the art that the fan casing 40 may be supported relative to the core engine 14 by a plurality of substantially radially-extending, circumferentially-spaced outlet guide vanes 42. As such, the fan casing 40 may enclose the fan rotor assembly 38 and its corresponding fan rotor blades 44. Moreover, a downstream section 46 of the fan casing 40 may extend over an outer portion of the core engine 14 so as to define a secondary, or by-pass, airflow conduit 48 providing additional propulsive jet thrust.

It should be appreciated that, in several embodiments, the low pressure shaft 34 may be directly coupled to the fan rotor assembly 38 to provide a direct-drive configuration. Alternatively, the low pressure shaft 34 may be coupled to the fan rotor assembly 38 via a speed reduction device 37 (e.g., a reduction gear or gearbox) to provide an indirect-drive or geared drive configuration. Such a speed reduction device(s) may also be provided between any other suitable shafts and/or spools within the engine as desired or required.

During operation of the turbofan 10, it should be appreciated that an initial air flow (indicated by arrow 50) may enter the turbofan 10 through an associated inlet 52 of the fan casing 40. The air flow 50 then passes through the fan blades 44 and splits into a first compressed air flow (indicated by arrow 54) that moves through conduit 48 and a second compressed air flow (indicated by arrow 56), which enters the low pressure compressor section 22. The pressure of the second compressed air flow 56 is then increased and enters the high pressure compressor section 24 (as indicated by arrow 58). After mixing with fuel and being combusted within the combustor 26, the combustion products 60 exit the combustor 26 and flow through the high pressure turbine section 28. Thereafter, the combustion products 60 flow through the low pressure turbine section 32 and exit the exhaust nozzle 36 to provide thrust for the engine 10.

Along with a turbofan 10, a core turbine 14 serves a similar purpose and sees a similar environment in land-based gas turbines, turbojet engines in which the ratio of the first portion of air 54 to the second portion of air 56 is less than that of a turbofan, and unducted fan engines in which the fan section 16 is devoid of the annular fan casing 40.

Figure 2:
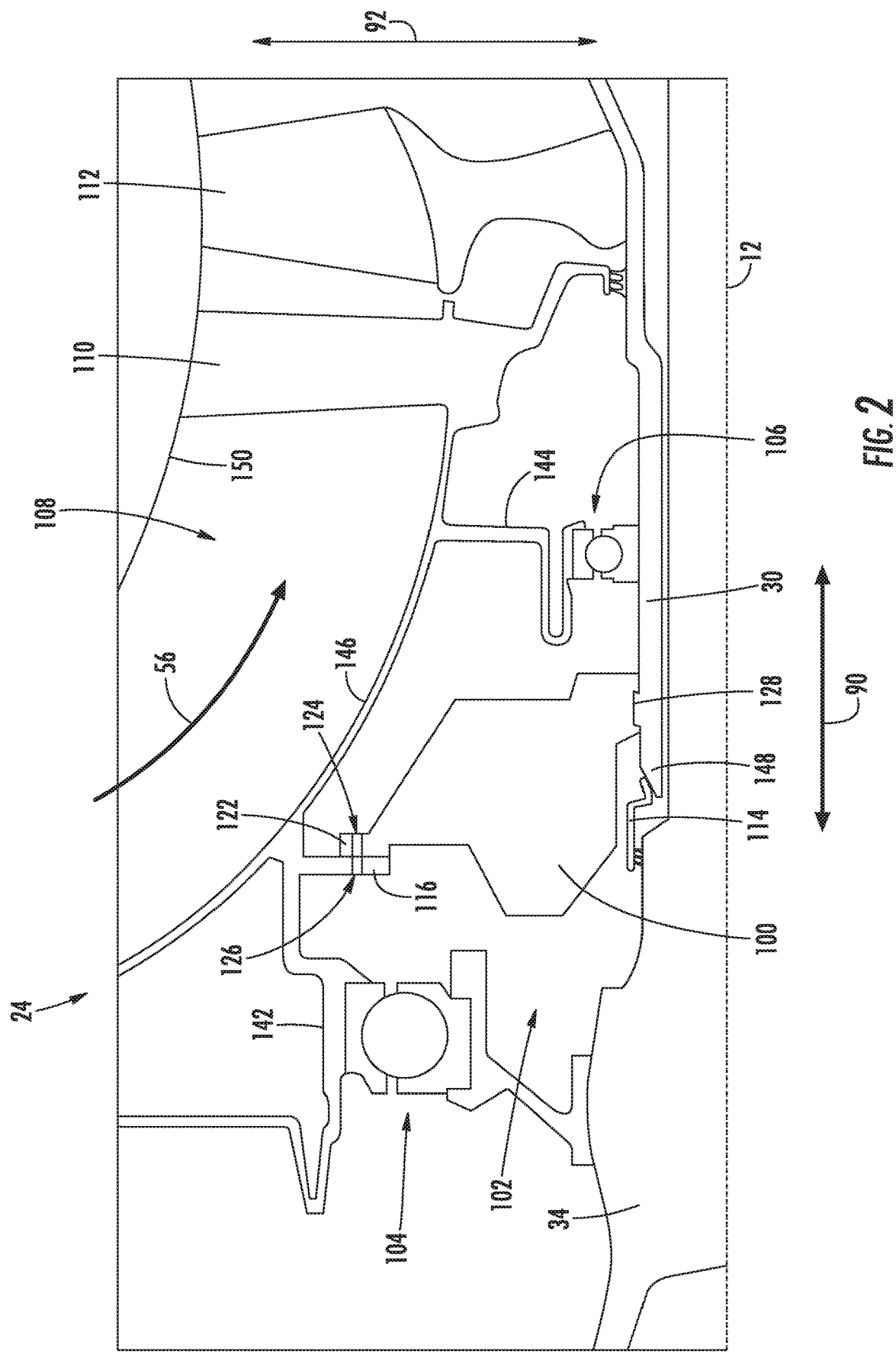
FIG. 2 is a cross-sectional view of the a high pressure compressor, illustrating the positioning of a starter assembly therein.
Figure 3:
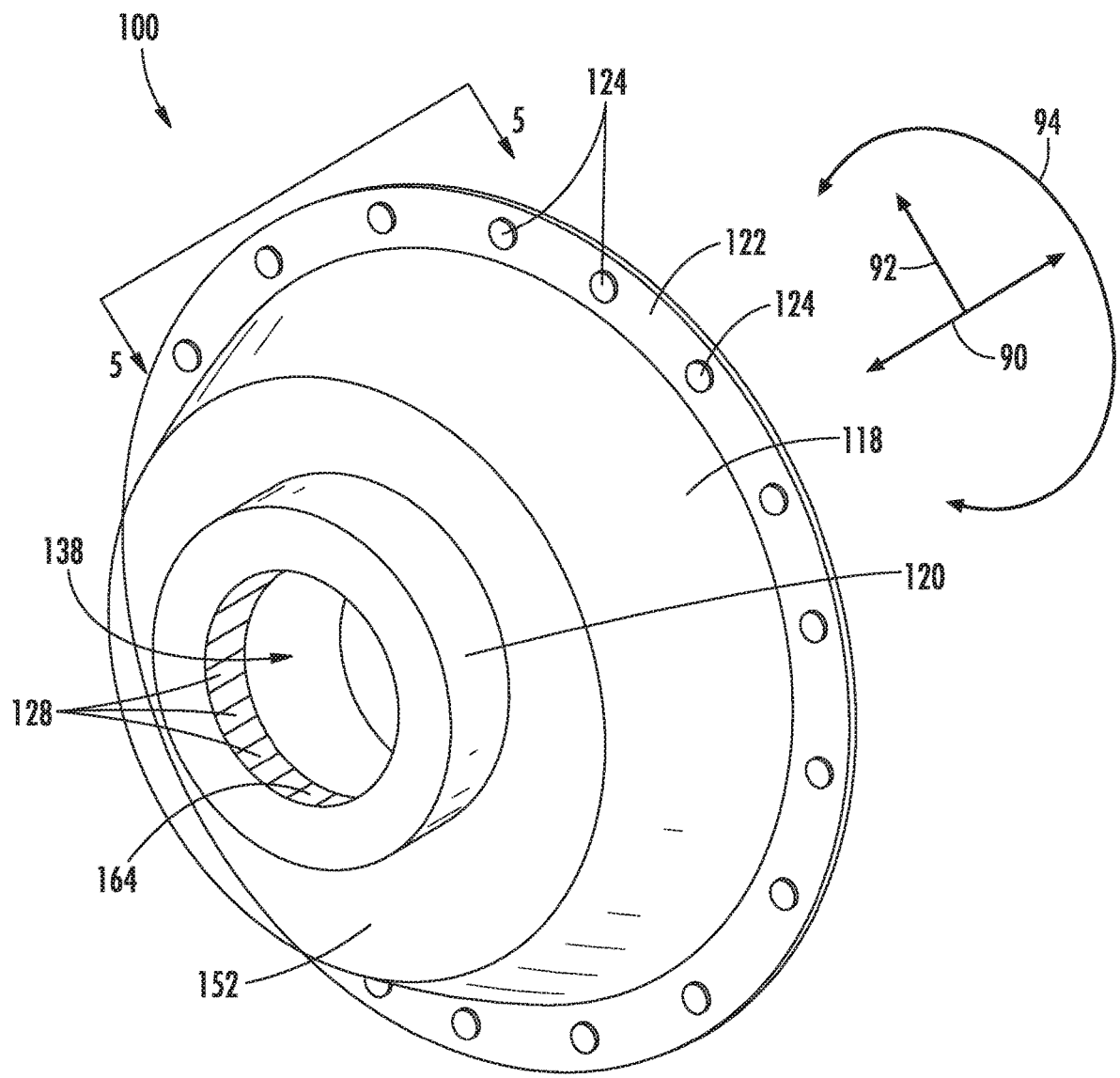
FIG. 3 is a perspective view of the starter assembly in accordance with the embodiments disclosed herein.
Figure 4:
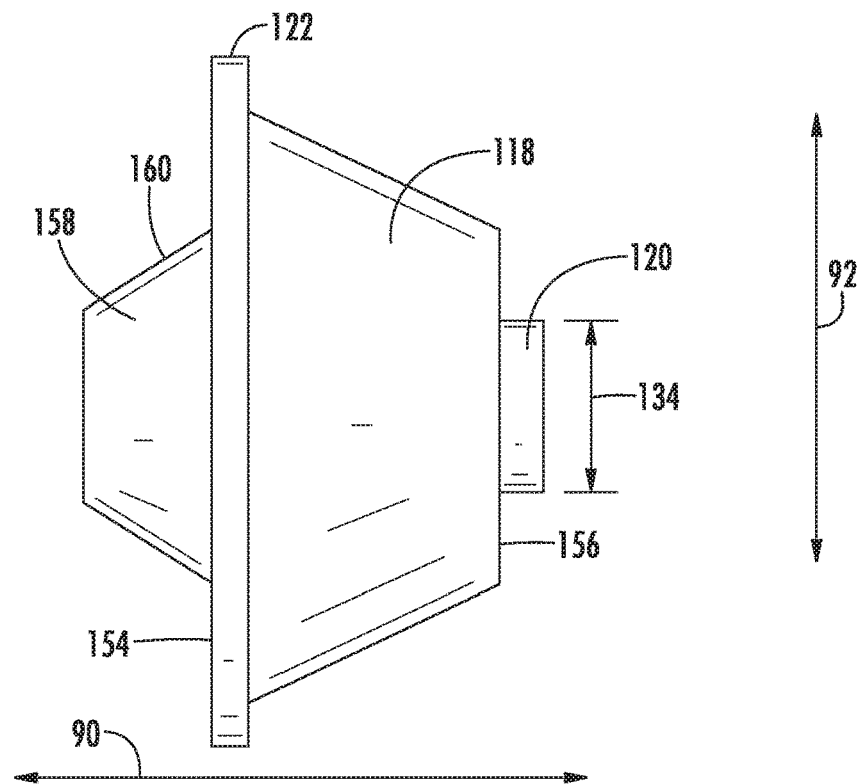
FIG. 4 is a side view of the starter assembly, further illustrating the features thereof.
Figure 5:
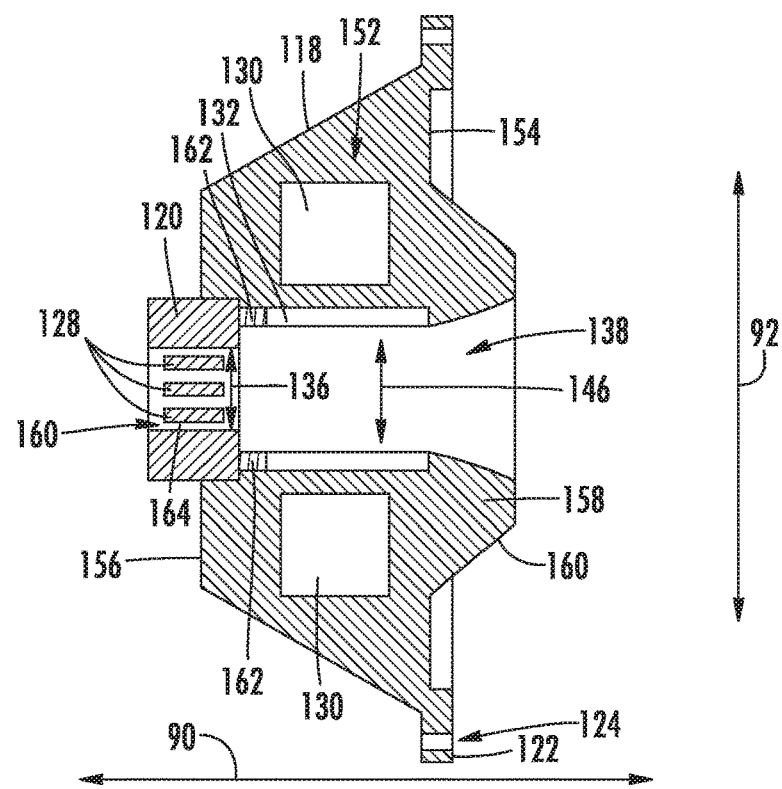
FIG. 5 is a cross-section view of the starter assembly generally taken about line 5-5 in FIG. 4, illustrating the internal features of thereof.

FIGS. 2-5 illustrate the various components and features of a starter assembly 100 for starting the turbofan 10. More specifically, FIG. 2 is a cross-sectional view of the high pressure compressor section 24, illustrating the position of the starter assembly therein. FIGS. 3-5 are a perspective view, a side view, and a cross-sectional view of the starter assembly 100, respectively.

As illustrated in FIGS. 2-5, the starter assembly 100 defines an axial direction identified by an arrow 90, a radial direction identified by an arrow 92, and a circumferential direction identified by an arrow 94. In general, the axial direction extends along the longitudinal axis 12, the radial direction extends orthogonally outward from the longitudinal axis 12, and the circumferential direction extends concentrically around the longitudinal axis 12.

As illustrated in FIG. 2, the high pressure compressor section 24 includes a radially inner wall 146 and a radially outer wall 150 that define an annular conduit 108 through which the air flow 56 flows. The conduit 108 includes a plurality of stator vanes 110 (only one is shown) and a plurality of compressor blades 112 (only one is shown). The plurality of compressor blades 112 rotatably couples to high pressure shaft 30.

The starter assembly 100 may be positioned in the high pressure compressor section 24 of the gas turbine 10. In particular, the starter assembly 100 may be positioned in a compartment or sump 102 in the high pressure compressor section 24 of the gas turbine 10. An upstream compartment wall 142, a downstream compartment wall 144, and portions of the high pressure shaft 30, the low pressure shaft 34, and the radially inner wall 146 collectively define the compartment 102. An upstream bearing assembly 104 permits relative rotation between the low pressure shaft 34 and the upstream compartment wall 142. A downstream bearing assembly 106 similarly allows relative rotation between the high pressure shaft 30 and the downstream compartment wall 144. The upstream and downstream bearing assemblies 104, 106 may be ball bearing assemblies as illustrated in FIG. 2 or any other suitable type of bearing assembly.

The compartment 102 is preferably filled with lubricant (e.g., oil) that simultaneously lubricates and cools the bearing assemblies 104, 106. In this respect, a clip 114 may span the gap between the upstream end of the high pressure shaft 30 and the low pressure shaft 34 to prevent lubricant from flowing therebetween. That is, the clip 114 separates the compartment 102 from the interior of the high pressure shaft 30 and the low pressure shaft 34. The clip 114 preferably permits the high pressure shaft 30 and the low pressure shaft 34 to rotate independently (i.e., at different rotation velocities). Although, the compartment 102 may not be filled with lubricant or coolant.

A mounting wall 116 extends radially inward from the upstream compartment wall 142 for mating with a flange 122 extending radially outward from the starter assembly 100. The mounting wall 116 may define a plurality of mounting wall apertures 126, which align with a complementary plurality of flange apertures 124 defined by the flange 122. The plurality of flange apertures 124 and the plurality of mounting apertures 126 may receive a plurality of fasteners (not shown) for securing the starter assembly 100 to the mounting wall 116. Although, the mounting wall 116 and the flange 122 may be joined by welding or any other suitable method.

The starter assembly 100 rotatably couples to an upstream end 148 of the high pressure shaft 30. In this respect, the starter assembly 100, when activated, rotates the high pressure shaft 30 and the plurality of turbine blades 112, thereby providing the air flow 56 to the combustor 26. In alternate embodiments, the starter assembly 100 may connect to the low or high pressure shaft 30, 34 in the low pressure compressor section 22, the high pressure turbine section 28, or the low pressure turbine 32.

As illustrated in FIGS. 3-5, the starter assembly 100 includes a housing 118, which encloses a starter 152. The housing 118 includes a first end 154 and a second 156. The housing 118 is preferably annular, thereby defining a central housing passageway 138 having a central housing passageway diameter 140 extending therethrough. The housing 118 extends circumferentially around the high pressure shaft 30 and the low pressure shaft 34. As such, the central housing passageway 138 provides clearance for the high pressure shaft 30 and the low pressure shaft 34. In this respect, the central housing passageway diameter 140 may be relatively greater than the outer diameter of the high pressure shaft 30. The housing 118 may extend radially inward or radially outward from the first end 154 to the second 156.

The starter 152 is preferably an electric starter. In this respect, the starter 152 includes a stator 130 and a rotor 132. Briefly, the stator 130 causes the rotor 132 to rotate when electric current is supplied to the starter 152. The rotor 132 may be an annular shaft as illustrated in FIG. 5, but may also be a solid shaft as well. Any suitable electric motor can be utilized within the starter 152, including either a DC or AC motor. The starter 152 preferably receives electric current from a battery or other electric current source, such as a generator (not shown). In other embodiments, the starter 152 may a hydraulic starter, a pneumatic starter, or any other suitable type of starter.

The flange 122 extends radially outward from the housing 118. The flange 122 may fixedly attach (e.g., via welding) or integrally attach to the housing 118. As briefly mentioned above, the flange 122 may define the plurality of flange apertures 124, which align with the mounting wall apertures 126 (FIG. 2) and receive fasteners (not shown) to couple starter assembly 100 to the mounting wall 116. The plurality of flange apertures 124 may be positioned around the entire circumference of the flange 122 as shown in FIG. 3 or only a portion thereof. Moreover, the plurality of flange apertures 124 may be evenly distributed around the circumference of the flange 122 as illustrated in FIG. 3 or unevenly distributed therearound. In alternate embodiments, the flange 122 may extend around only a portion of the housing 118.

The housing 118 may include an annular boss 158 having a radially outer wall 160 extending axially outward from the first end 154. In this respect, the central housing passageway 138 extends through the boss 158. In one embodiment, the central housing passageway 138 may flare radially outwardly as the central housing passageway 138 extends axially outwardly through the boss 158. Although, the central housing passageway diameter 140 may be uniform. The boss 158 may be integrally or fixedly attached to the housing 118. Preferably, the radially outer wall 160 is chamfered as illustrate in FIGS. 4-5; although, the radially outer wall 160 may be parallel to the axial centerline 12.

The starter assembly 100 further includes an annular collar 120 extending axially outward from the second end 156 of the housing 118. In this respect, the collar 120 includes a radially inner surface 164 and a central collar passageway 160 having a central collar passageway diameter 136 extending therethrough. The central collar passageway diameter 136 is preferably relatively smaller than the central housing passageway diameter 140. Although, the central collar passageway diameter 136 may be the same size as the central housing passageway diameter 140. The collar 120 also includes an outer diameter 134.

The collar 120 selectively rotatably couples to the housing 118. In particular, the collar 120 drivingly connects to the rotor 132 via a clutch 162 that selectively rotatably couples and decouples the collar 120 and the rotor 132. The clutch 162 couples the collar 120 and the rotor 132 when the starter 152 is activated and decouples the collar 120 and the rotor 132 when the starter 152 is inactive. In this respect, the collar 120 may rotate relative to the housing 118. In alternate embodiments, however, the collar 120 and the rotor 132 may be fixedly coupled. That is, the collar 120 may not be able to rotatably disengage the rotor 132.

Furthermore, the collar 120 drivingly engages the high pressure shaft 30. More specifically, the radially inner surface 164 of the collar includes a plurality of splines 166, which engage a plurality of complementary splines 128 (FIG. 2) on the high pressure shaft 30. That is, each of the plurality of splines 166 on the collar 120 fits between the adjacent splines 128 on the high pressure shaft 30. In this respect, the splines 166 and the splines 128 transmit torque from the collar 120 to the high pressure shaft 30.

The starter assembly 100 may be used to start the gas turbine engine 10. When the starter 152 is deactivated (i.e., not starting the engine 10), the clutch 162 decouples the collar 120 and the rotor 132. In this respect, the collar 120 may rotate freely and without rotating the rotor 132 when the high pressure shaft 30 rotates. When the starter 152 is activated (i.e., starting the engine 10), however, the clutch 162 rotatably couples the collar 120 and the rotor 132. When the starter 152 receives electric current, the stator 130 causes the rotor 132 to rotate relative to the stator 130, thereby rotating the collar 120. The splines 166 and the splines 128 transmit the rotation to the high pressure shaft 30, which, in turn, rotates the compressor blades 112. Once the turbofan 10 is started, the clutch 162 decouples the collar 120 and the rotor 132 to permit the high pressure shaft 30 and the collar 120 to rotate without rotating the rotor 132. Alternately, the collar 120 and the rotor 132 may remain coupled during operation of the turbofan 10 in order to, e.g., generate electricity.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A gas turbine starting system, comprising:
    a shaft coupling a high pressure compressor and a turbine;
    an annular housing extending circumferentially around the shaft, wherein the annular housing defines a compartment, and wherein the annular housing is located axially between the high pressure compressor and a low pressure compressor
    a flange extending radially outward from the annular housing for mounting the annular housing to a stationary wall;
    a hydraulic or pneumatic motor positioned in the compartment; and
    a collar rotatably coupled to the annular housing and selectively coupled to the hydraulic or pneumatic motor such that the hydraulic or pneumatic motor is positioned axially between the collar and the flange; the collar comprising a radially inner surface comprising a plurality of splines for engaging the shaft;
    wherein the hydraulic or pneumatic motor, when activated, rotates the collar, which rotates the shaft to start the gas turbine.

2. The gas turbine starting system of claim 1, wherein the shaft comprises a high pressure shaft.

3. The gas turbine starting system of claim 2, wherein the collar rotatably couples to an upstream end of the high pressure shaft.

4. The gas turbine starting system of claim 3, wherein the annular housing extends circumferentially around the high pressure shaft and a low pressure shaft.

5. The gas turbine starting system of claim 1, wherein the annular housing comprises a first axial end and a second axial end, and further wherein the collar rotatably couples to the first axial end and an annular boss extends axially outward from the second axial end.

6. The gas turbine starting system of claim 5, wherein the collar extends axially outward from the first axial end of the annular housing.

7. The gas turbine starting system of claim 1, wherein the flange defines a plurality of apertures extending therethrough.

8. A gas turbine, comprising:
    a compressor section having a high pressure compressor and a low pressure compressor;
    a combustor;
    a turbine section;
    a shaft coupling the high pressure compressor and the turbine section;
    an annular housing extending circumferentially around the shaft, wherein the annular housing defines a compartment, and wherein the annular housing is located axially between the high pressure compressor and the low pressure compressor;
    a flange extending radially outward from the annular housing for mounting the annular housing to a stationary wall;
    a hydraulic or pneumatic motor positioned in the compartment; and
    a collar rotatably coupled to the annular housing and selectively coupled to the hydraulic or pneumatic motor such that the hydraulic or pneumatic motor is positioned axially between the collar and the flange; the collar comprising a radially inner surface comprising a plurality of splines for engaging the shaft;
    wherein the hydraulic or pneumatic motor, when activated, rotates the collar, which rotates the shaft to start the gas turbine.

9. The gas turbine of claim 8, wherein the shaft comprises a high pressure shaft.

10. The gas turbine of claim 9, wherein the collar rotatably couples to an upstream end of the high pressure shaft.

11. The gas turbine of claim 10, wherein the annular housing extends circumferentially around the high pressure shaft and a low pressure shaft.

12. The gas turbine of claim 8, wherein the annular housing comprises a first axial end and a second axial end, and further wherein the collar rotatably couples to the first axial end and an annular boss extends axially outward from the second axial end.

13. The gas turbine of claim 12, wherein the collar extends axially outward from the first axial end of the annular housing.

14. The gas turbine of claim 8, wherein the flange defines a plurality of apertures extending therethrough.

15. The gas turbine of claim 8, wherein the annular housing is positioned in a sump within the compressor section.

16. The gas turbine of claim 8, wherein the annular housing is positioned radially inward of a radially inner wall of the compressor section.

* * * * *